Feb. 28, 1950 W. E. WAELDE 2,498,869
INSULATOR
Filed Dec. 29, 1948

INVENTOR.
William E. Waelde.
BY
Harness and Harris
ATTORNEYS.

Patented Feb. 28, 1950

2,498,869

UNITED STATES PATENT OFFICE 2,498,869

INSULATOR

William E. Waelde, Detroit, Mich., assignor to Chrysler Corporation, Highland Park, Mich., a corporation of Delaware Application December 29, 1948, Serial No. 68,011

6 Claims. (Cl. 219—4)

My invention relates to welding equipment and more particularly to an improved insulator for use with spot welding mechanisms.

In the past, the use of spot welding mechanism which includes a copper welding head frictionally connected to power driven pressure applying means through an electric insulator disposed within the head, has involved much loss of operating time and expense due to the short life of the conventional insulators used and the necessity of frequent replacement thereof. Such insulators have been formed of relatively hard and brittle insulating material which would not withstand the repeated shock and wedging action to which they were subjected by the power driven pressure applying means utilized to force the electrodes of the spot welding apparatus against the metal being welded. Furthermore, the fragility of the material of which conventional insulators of this kind are formed requires a considerable wall thickness and a correspondingly large thickness of the head which prevents the welding electrodes of multiple spot welding devices from being spaced close together to produce closely adjacent spot welds.

A principal object of my invention is to provide welding equipment with insulators for electrically insulating the welding heads and the power driven pressure applying means of the equipment in a novel and improved manner.

Another object of my invention is to provide an insulator for spot welding equipment which has a longer life compared to other insulators known to the art.

A further object of my invention is to provide spot welding equipment with an insulator which allows the use of a smaller welding head compared to those known to the art thereby facilitating the placement of the heads at closer intervals than are ordinarily possible.

Other objects and advantages will become more apparent from the following description of one embodiment of my invention, reference being had to the accompanying drawings in which.

Figure 1:
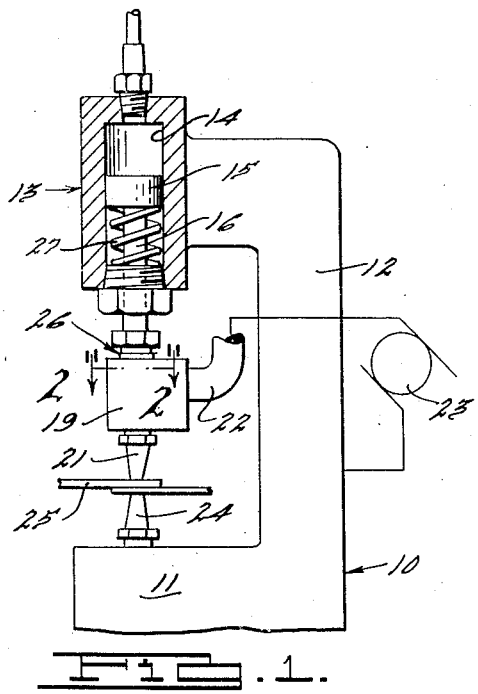
Fig. 1 is a side elevational view of a spot welding machine employing my improved structure.
Figure 2:
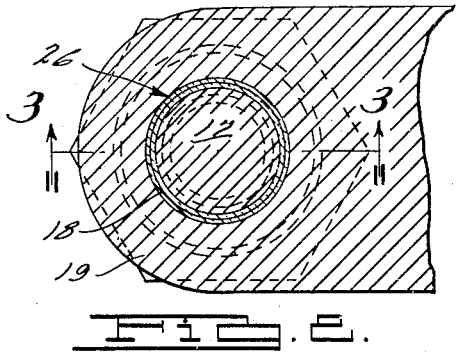
Fig. 2 is a fragmentary, transverse sectional view taken on the line 2—2 of Fig. 1.
Figure 5:
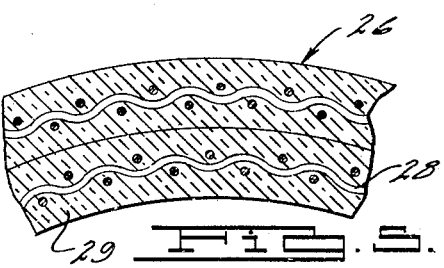
Fig. 5 is an enlarged fragmentary sectional view taken on line 5—5 of Fig. 4.
Figure 3:
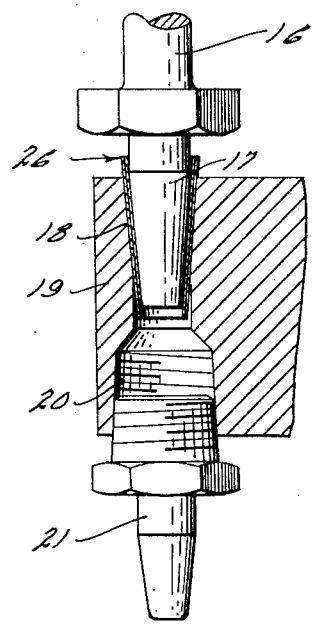
Fig. 3 is a vertical sectional view taken on the line 3—3 of Fig. 2.
Figure 4:
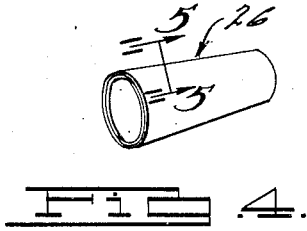
Fig. 4 is a prospective view of my improved insulator.

In the drawings I have shown a welding machine generally designated by the numeral 10 having a base 11 which is integrally connected to one end of an upright inverted L-shaped supporting column 12. The other end of the L-shaped column 12 is connected to hydraulic power driven pressure applying means generally designated by the numeral 13. The pressure applying means 13 includes a cylinder 14 in which is shiftably mounted a piston 15 having a piston rod 16. The piston rod 16 is provided on its external end with a tapered stem 17. The outwardly extending end of the projection or stem 17 is tapered to a frusto-conical configuration and is positioned within a frusto-conical opening 18 formed within a welding head 19. The smaller end of the opening 18 opens into a large threaded opening 20 which receives the threaded portion of a welding electrode 21. The electrode 21 may be of any conventional type and is removable from the head 19 in order that the appropriate size and shape of welding electrode may be carried by the head 19. The head 19 is provided with a wire conduit 22 which is connected to an appropriate source of electrical energy such as a generator 23, the other side thereof being grounded, as for example, to the column 12, as shown in Fig. 1. The base 11 is provided with a second welding electrode 24 which is disposed thereon opposite the welding head 21 so that material 25 to be welded may be placed between the electrodes 21 and 24.

An insulator 26 comprising a tapered sleeve is disposed between the stem 17 and the walls of the opening 18 so that the tapered portion of the stem 17 engages the inner surface of the insulator while the walls of the opening 18 engage the outer surface of the insulator 26. The insulator 26 is of a hollow frusto-conical configuration so that the tapered end of the stem 17 may be wedgingly, frictionally retained within the insulator due to the pressure exerted thereon by the walls of the opening 18. In this manner the head 19 is carried by the stem 17 and moved with it into and out of its welding position in response to actuation by the hydraulic power means 13 and the spring 27 thereof which operates upon the piston 15 to produce the return stroke of the latter.

The insulator 26 comprises any suitable type of mineral fibers impregnated with resin preferably of the thermosetting type. While fabric or fibrous sheet material formed of glass fibers is preferred, it is recognized that resin impregnated sheet-like fibrous material formed of various mineral fibers, such as asbestos, may be used. Several types of resins of this character have been found to be very satisfactory for this purpose. These types include resins of the polyester types such as maleic anhydride and diallyl phthalate, polystyrine resin and copolymers of polystyrine resin and diallyl phthalate; phenolic resins such as pheno formaldehyde resins and cresyl formaldehyde resins. The insulator 26 may be conveniently formed from resin impregnated material such as glass cloth 28 impregnated with resin 29, which may be wound around a mandrel of frusto-conical shape and thereafter subjected to pressure and heated at a temperature of approximately 212 to 300° F., depending upon the type of material and the type of resin employed, for periods of 15 to 60 minutes.

In operation, the power driven actuating means 13 advances the head 19 and the electrode 21 towards the work 25 until the electrodes 21 and 24 engage the work at which time electrical current is supplied through the head 19, the electrodes 21 and 24 and the base 11. The electrodes 21 and 24 as well as the head 19 comprise copper for allowing the required amount of current to flow through the electrical circuit. It is therefore necessary to properly insulate the head 19 from the stem 17 so that current will not flow through the hydraulic mechanism. The insulator 26 acts to prevent the flow of current from the head 19 to the stem 17 as well as to provide suitable surface area at both the walls of the opening 18 and the periphery of the tapered portion of the stem 17 to facilitate the required frictional engagement of the head 19 on the stem 17.

It has been found that my improved type of insulator will not be broken down under repeated applications of pressure from the power driven pressure applying means 13 and will constantly maintain suitable electrical insulation between the stem 17 and the head 19. Further, the resin impregnated insulator 26 is resistant to the heat generated in the head 19.

Further, the use of my improved insulator 26 facilitates the use of a much narrower head 19 in the welding mechanism. In the insulators known to the art, the head 19 was required to be relatively larger, due to the wall thickness of the insulator, in order that the head 19 would accommodate the insulator. It may be readily seen, however, that the use of my improved insulator allows the use of a plurality of heads 19 on one welding machine having a plurality of pressure applying stems 17 wherein the heads 19 may be placed in a much closer relationship due to their reduced transverse width. In this manner spot welds may be simultaneously made in close proximity to each other.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In welding mechanism comprising a head member having a tapered recess therein and power actuated pressure applying means having a tapered projection adapted to be positioned within said recess; an insulator adapted to be disposed between said projection and the walls of said recess comprising a tapered sleeve of uniform wall thickness formed of non-conductive non-metallic material.

2. In welding mechanism comprising a head member having a tapered recess therein and power actuated pressure applying means having a tapered projection adapted to be positioned within said recess; an insulator adapted to be disposed between said projection and the walls of said recess comprising a tapered sleeve of resin impregnated electrically non-conductive sheet material.

3. In welding mechanism comprising a head member having a tapered recess therein and power actuated pressure applying means having a tapered projection adapted to be positioned within said recess; an insulator adapted to be disposed between said projection and the walls of said recess comprising a frusto-conical resin impregnated glass cloth sleeve.

4. In welding mechanism comprising a head member having a tapered recess therein and power actuated pressure applying means having a tapered projection adapted to be positioned within said recess; an insulator adapted to be disposed between said projection and the walls of said recess comprising a sheet of glass cloth impregnated with thermosetting resin and formed to a frusto-conical shape.

5. In welding mechanism comprising a head member having a tapered recess therein and power actuated pressure applying means having a tapered projection adapted to be positioned within said recess; an insulator adapted to be disposed between said projection and the walls of said recess comprising a sheet of resin impregnated electrically non-conductive material of a hollow frusto-conical shape.

6. In welding mechanism comprising a head member adapted to carry electric current and having a frusto-conical recess therein, and means having a frusto-conical projection extending within said recess for applying pressure to said head member for effecting operation of said mechanism; a sleeve adapted to be disposed between said projection and the wall of said recess for electrically insulating said projection from said wall and for frictionally maintaining said projection within said recess, said sleeve comprising a resin impregnated glass cloth in the form of a hollow frusto-cone.

WILLIAM E. WAELDE.

REFERENCES CITED

The following references are of record in the file of this patent:

UNITED STATES PATENTS

| Number | Name | Date |
|---|---|---|
| 459,509 | Johns | Sept. 15, 1891 |
| 1,284,295 | Frederick | Nov. 12, 1918 |
| 1,778,164 | Platter et al. | Oct. 4, 1930 |
| 2,089,013 | Beiderman | Aug. 3, 1937 |
| 2,342,144 | Hughes | Feb. 22, 1944 |
| 2,400,031 | Stewart et al. | May 7, 1946 |